Jan. 19, 1937.　　L. C. ALGEE ET AL　　2,068,588
VEHICLE BRAKE
Filed Feb. 24, 1934　　2 Sheets-Sheet 1

Inventors
Lucian C. Algee +
Walker E. Weekson,
By L. Clyde Greer
Attorney

Jan. 19, 1937.  L. C. ALGEE ET AL  2,068,588

VEHICLE BRAKE

Filed Feb. 24, 1934  2 Sheets-Sheet 2

Inventor
Lucian C. Algee &
Walker E. Alleckson,
By Clyde Grear
Attorney

Patented Jan. 19, 1937

2,068,588

UNITED STATES PATENT OFFICE 2,068,588

VEHICLE BRAKE

Lucian C. Algee, Orlando, and Walker E. Dickson, New Smyrna, Fla.

Application February 24, 1934, Serial No. 712,834

9 Claims. (Cl. 188—78)

This invention relates to certain improvements in brakes, and more particularly to wheel brakes of the internal expanding type, operated either mechanically or by fluid pressure.

The object of the invention is the production of a brake of the character indicated, whereby a uniform motion and a uniform and equalizing pressure will be imparted to the brake shoe throughout its entire movement, by a wedging action or thrust produced by a member of novel form, to be hereinafter referred to as a yoke, as distinguished from a variable pressure resulting from the use of the conventional toggles or cams found in brakes in use at the present time.

Another object is to produce a brake mechanism which will permit a maximum wear on the brake linings with a minimum amount of adjustment of the brake. This is accomplished by the use of the particular construction of yoke provided with inclined planes cooperating with the brake shoes, to be hereinafter more fully described. In fact no adjustment will be necessary after proper original adjustment, except that usually required from time to time at the brake pedal in ordinary automobile brake systems.

A further object is the production of a brake construction whereby it will be impossible for the brakes to stick or jam or fail to operate at any time.

Furthermore, by the uniform application of force through incline planes, the brake may be applied softly and smoothly, and yet with any degree of positive action that may be necessary in an emergency, as the pressure upon the brake lining will at all times be directly proportional to the pressure applied to the brake pedal or in fluid cylinders, where the brake is operated by fluid pressure, and this force will not be in disproportion as must necessarily occur when the actuating device is a toggle or irregular cam.

The preferred embodiment of the invention is illustrated in the accompanying drawings in which, Figure 1 is a view partly in elevation and partly in section showing the improved brake assembly complete;

Figure 1:
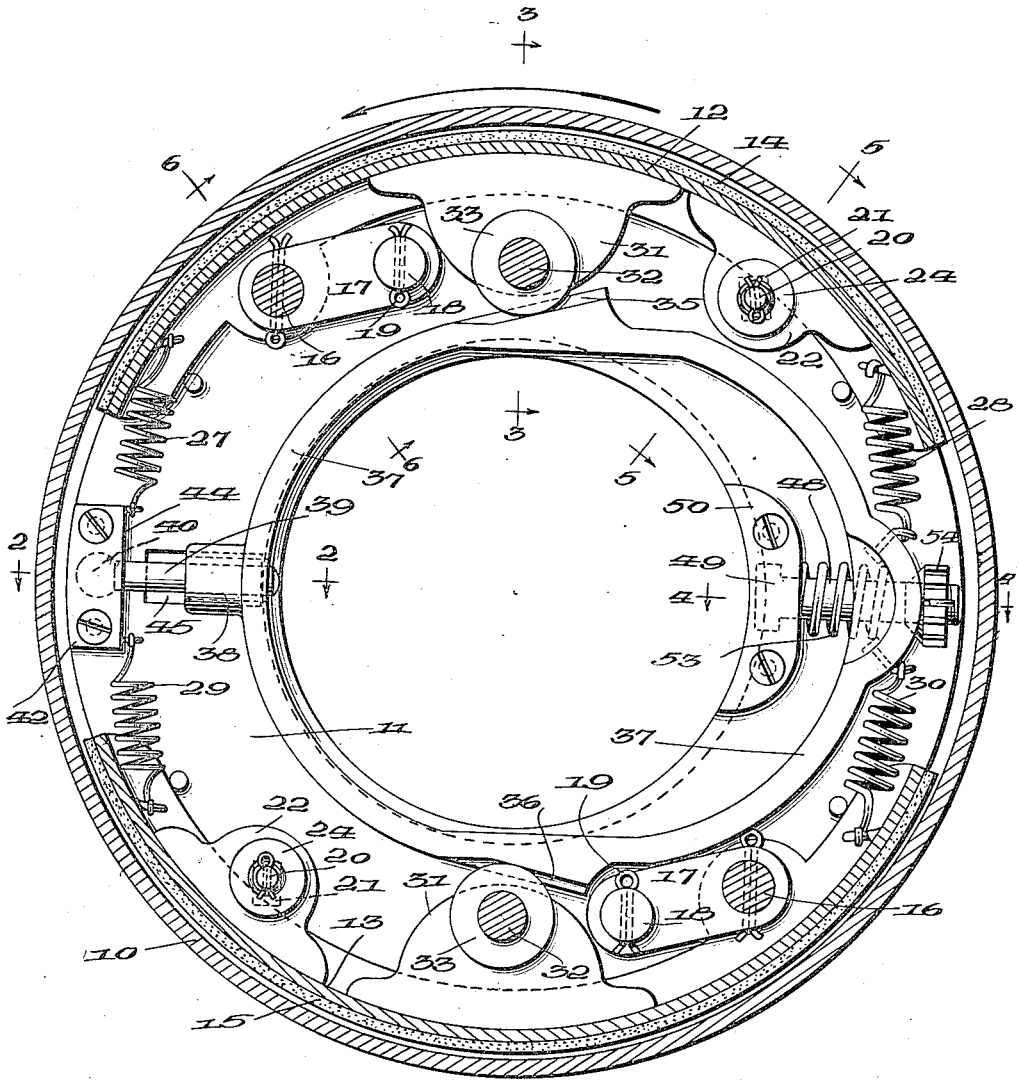

Referring to the drawings in detail the improved brake mechanism comprises a brake drum or the like 10, having associated therewith the usual cover or backing plate 11, said cover plate being stationary and formed as a part of, or rigidly secured to, the axle housing (not shown).

Suspended from the inner face of cover plate 11, and diametrically oppositely arranged, are two brake shoes 12 and 13, preferably of inverted channel form, and provided with the usual brake lining or facing 14 and 15 respectively.

Figure 6:
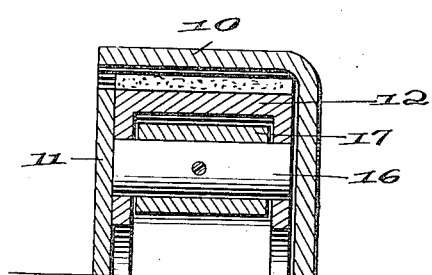
Figure 6 is a detail view of the floating pivotal connector for the opposite end of each of the brake shoes.

One end of each brake shoe is provided with a pivot pin 16 having keyed thereto one end of a link or the like 17, (see Fig. 6) the opposite end of said link being pivotally supported upon a pin 18 rigidly carried by the stationary cover plate 11, and locked on said pin by a cotter pin or key 19.

Figure 5:
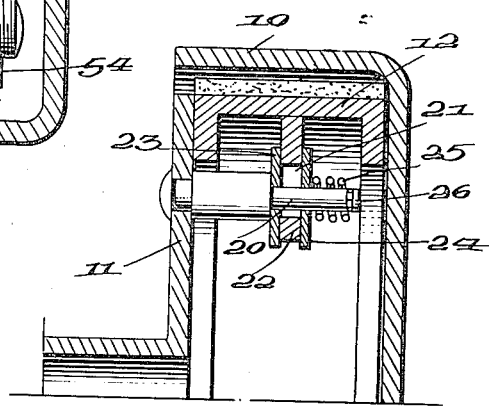
Figure 5 is an enlarged detail view on line 5—5 of Figure 1 showing the means for positioning one end of each of the brake shoes.

The opposite end of each brake shoe is supported upon a pin 20 rigidly carried by the cover plate and extending through a slot 21 formed in an inwardly projecting web member 22 secured to the inner face of the brake shoe intermediate the side edges thereof, as more clearly shown in Figure 5.

Referring more particularly to Figure 5, it will be noted that, that part of the pin operating in the slot 21 is reduced in diameter, to allow a certain amount of play or movement between the parts. Cooperating with this pin 20 and slot 21 are disks or washers 23 and 24, and the whole assembly is maintained in operative position by a compression spring 25 and a cotter pin or key 26.

This combination of elements, comprising the aforementioned linkage 16—17 and 18 together with the pin and slot arrangement 20 and 21, assist in maintaining the rigidity of the brake shoes in a horizontal direction without interfering with the throw of the shoe toward and away from the brake drum, and the linkage 16, 17, and 18 comprises the principal means for taking the thrust or braking force between the stationary backing plate 11 and brake drum 10.

The cooperating pin and slot supporting means 20 and 21 above described, permits the necessary motion in the direction of contact with the brake drum, but at the same time prevents lateral motion and also act as an anti-rattler for the brake shoes.

To complete the brake shoe suspension the ends of the brake shoes are provided with springs 27, 28, 29, and 30, the manner of mounting and securing these springs to be hereinafter more fully described. The springs 27 and 30 may, if desired, be slightly weaker than the springs 28 and 29 for the purpose of inducing an earlier contact with the trailing end of each brake shoe, and thereby producing the desired wrapping action, and increasing the smoothness of the application of the brake shoes, the brake drum rotating in a counter-clockwise direction as indicated by the arrow, Figure 1.

Figure 3:
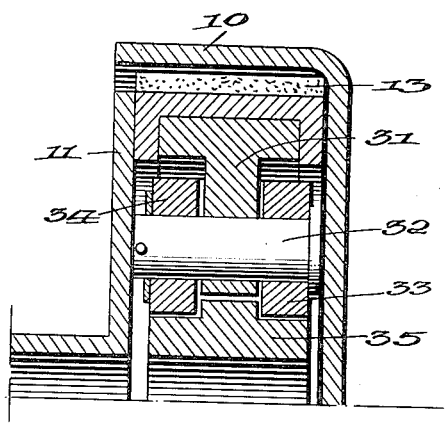
Figure 3 is an enlarged detail sectional view on line 3—3 of Figure 1, showing the cam and roller construction which is merely one arrangement of parts through which the desired thrust or wedging action is transmitted to the brake shoes.

Intermediate the ends of each brake shoe is an inwardly extending web or the like 31 supporting a journal 32 upon which is rotatably mounted a pair of rollers 33 and 34 arranged on each side of the web 31 as more clearly shown in Figure 3.

Cooperating with these rollers of each brake shoe, are inclines or cam faces 35 and 36 carried by a transversely sliding yoke or the like 37. This yoke is of substantially oval shape and is adapted to encircle the axle or axle housing (not shown), said cam faces being diametrically oppositely arranged as clearly shown in Figure 1.

Figure 2:
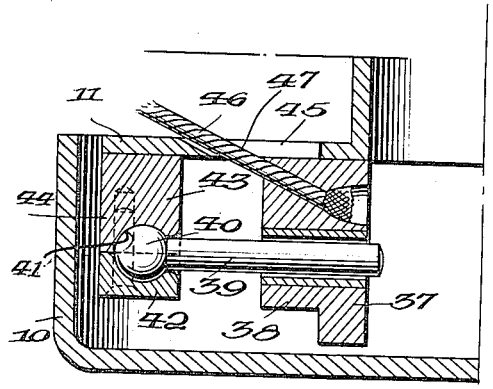
Figure 2 is an enlarged detail sectional view on line 2—2 of Figure 1, illustrating one means of slidably anchoring the forward end of the yoke and means of attaching any desired type of operating mechanism to said yoke.

As hereinbefore stated, the yoke 37 is oval or elliptical in shape, and is adapted to completely surround the axle and bearings, (not shown). The forward end of this yoke 37 is provided with a sleeve or collar 38 slidably supported upon a pin or rod 39, the forward end of said rod being formed with a spherical head 40, positioned in a socket 41 formed by the cooperating parts 42 and 43 comprising an anchoring block 44 rigidly secured to the stationary backing plate 11, as shown in detail in Figure 2. Adjacent the sleeve 38, the backing plate 11 is provided with an opening 45 through which extends an operating cable, rod or the like 46 having its end secured to yoke 37 as at 47. This cable, rod or the like 46 is the means of applying mechanical, air or hydraulic force to the brake shoes through the yoke 37.

Figure 4:
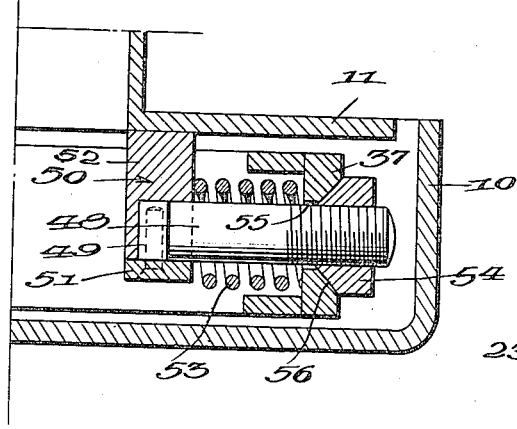
Figure 4 is an enlarged detail sectional view on line 4—4 of Figure 1, illustrating the preferred means of anchoring the rear end of the yoke to permit sliding movement and cause an automatic return of the yoke to inoperative position, and at the same time acting as an anti-rattling device.

The rear end of the yoke 37 is slidably supported upon a bolt or rod 48 having a T head 49 rigidly secured in an anchoring block 50 comprising cooperating parts 51 and 52 (see Fig. 4). This anchoring block 50 is rigidly secured to the backing plate 11 or stationary housing. Between the inner face of the rear end of the yoke 37 and the anchor block 50, is a compression spring 53 and the assembly is completed by an adjusting nut 54 threaded on the outer end of the bolt 48. Around the outer edge of the adjusting nut 54 may be arranged slots or the like as shown in Figs. 1 and 4, providing one means of locking the nut in its adjusted position in an obvious manner. The opening 55, formed in the rear end of the yoke 37, through which the bolt passes is slightly larger than the diameter of the bolt 48 so as to allow for the maximum vertical movement of the yoke resulting from any variations in wear that may occur in the brake lining during use.

The forward end of the nut 54 is preferably of conical shape cooperating with a conical recess formed around the outer edge of the opening 55 as shown at 56 in Figs. 1 and 4, for properly centering the yoke at this point.

With this construction just described, the yoke 37 when released, is forced to its retracted or inoperative position, by the spring 53 as will be apparent upon referring to Figs. 1 and 4, this arrangement at the same time acting as an anti-rattling device for the yoke 37.

As shown in the drawings, that portion of the yoke 37 surrounding the bolt 48 is curved rearwardly and closed in by two side walls welded to the yoke to allow sufficient room for the spring 53, but this is not essential and might be dispensed with in larger models where there will be sufficient room for the spring at this point without this additional curvature or offset.

As hereinbefore stated, the ends of the brake shoes 12 and 13 are provided with tension springs 27, 28, 29, and 30. The outer ends of these springs are attached to their respective brake shoes and the inner ends of the springs 27 and 28 are secured to the anchor block 44, and the inner ends of the springs 29 and 30 are secured to opposite rear portions of the yoke 37 as clearly shown in Fig. 1.

From the foregoing description, taken in conjunction with the drawings, it is believed the operation of the brake mechanism will be apparent. A forward transverse movement of the yoke 37 will urge the cams or inclines 35 and 36 into wedging engagement with the rollers or the like 33 and 34, forcing the brake shoes outwardly against the brake drum 10, in a direction at right angles to the direction of movement of the yoke, and owing to the novel means of suspending the brake shoes in their assembled position, the same will be caused to exert a uniform, substantially balanced and positive pressure on said brake drum, and this motion will be constant throughout the entire simultaneous movements of the brake shoes.

Throughout the specification, for the purpose of description, the yoke has been defined as having a forward end and a rear end, but it is to be understood that said yoke and the entire mechanism may be reversed, turned, or arranged at any angle to the horizontal as, for example, the same may be operated vertically with the brake shoes at the sides instead of at the top and bottom as shown.

Although the yoke is generally circular, elliptical or irregular in shape, and adapted to surround the axle and operate between the brake shoes, its cross section may be varied to suit working conditions and requirements and the space available within the housing outside of the axle or bearings that may be included within the axle.

Nor are the applicants to be limited to the various details of construction as shown and specifically described herein, as these details of design may be varied, within the scope of the invention as defined in the appended claims.

What is claimed is:

1. In a brake, the combination with a movable part and a part adapted to rotate, of a pair of diametrically oppositely disposed brake shoes, a pivoted link for attaching one end of each shoe to the stationary part, means for loosely attaching the opposite end of each brake shoe to said stationary part, cam means engaging the intermediate portion of each brake shoe for forcing said brake shoes outwardly to engage the rotatable part and resilient means for normally maintaining said brake shoes in retracted position.

2. In a brake, the combination with a movable part and a part adapted to rotate, of a pair of oppositely disposed brake shoes, a pivoted link for suspending one end of each shoe from the stationary part, means for loosely pivoting the opposite end of each brake shoe to said stationary part, cam means for engaging the intermediate portion of each brake shoe for forcing said brake shoes outwardly to engage the rotatable part and resilient means carried by the ends of said brake shoes for normally maintaining the brake shoes in retracted position.

3. In a brake, the combination with a movable part and a part adapted to rotate, of a pair of oppositely disposed brake shoes, means for pivotally attaching one end of each shoe to the stationary part, means for loosely attaching the opposite end of each brake shoe to said stationary part, a transversely movable, substantially annular yoke provided with diametrically oppositely disposed cam faces adapted to engage each brake shoe and force the same outwardly into engagement with the rotatable part when said transversely movable member is moved to its operative position.

4. In a brake, the combination with a movable part and a part adapted to rotate, of a pair of oppositely disposed brake shoes, means for pivotally attaching one end of each shoe to the stationary part, means for loosely attaching the opposite end of each brake shoe to said stationary part, a transversely movable, substantially annular yoke provided with diametrically oppositely disposed cam faces adapted to engage each brake shoe at a point intermediate the ends thereof and simultaneously force them outwardly into engagement with the rotatable part when said transversely movable member is moved to its operative position.

5. In a brake, the combination with a movable part and a part adapted to rotate, of a pair of oppositely disposed brake shoes, a pivoted link for suspending one end of each shoe from the stationary part, means for loosely pivoting the opposite end of each brake shoe to said stationary part, a transversely movable, substantially annular yoke slidably mounted on and supported by said stationary part, straight inclined faces diametrically oppositely disposed on said member, each inclined face adapted to engage the intermediate portions of the respective brake shoes for forcing said brake shoes outwardly to engage the rotatable part and resilient means carried by the ends of said brake shoes for normally maintaining the brake shoes in retracted position.

6. In a brake, the combination with a movable part and a part adapted to rotate, of a pair of oppositely disposed brake shoes, a pivoted link for suspending one end of each shoe from the stationary part, means for loosely pivoting the opposite end of each brake shoe to said stationary part, anti-frictional means carried by the intermediate portion of each brake shoe, cam means for engaging said anti-frictional means for forcing said brake shoes outwardly to engage the rotatable part and resilient means carried by the ends of said brake shoes for normally maintaining the brake shoes in retracted position.

7. In a brake, the combination with a stationary part and a part adapted to rotate, of a pair of oppositely disposed brake shoes carried by the stationary part, a transversely movable substantially annular yoke, anchor pins for said yoke carried by said stationary part permitting a slidable movement of the yoke in one plane but preventing movement thereof in a plane at right angles to said first mentioned plane, cam faces diametrically oppositely disposed on said yoke adapted to engage said brake shoes for forcing the same into engagement with the rotatable part when said transversely movable member is moved to its operative position, means attached to one end of said yoke for causing said movement to operative position and a spring associated with the opposite end of said yoke for returning the same to inoperative or retracted position upon the release of said operating means.

8. In a brake, the combination with a stationary part and a part adapted to rotate, of a pair of oppositely disposed brake shoes carried by the stationary part, a transversely movable substantially annular yoke, anchor pins for said yoke carried by said stationary part permitting a slidable movement of the yoke in one plane but preventing movement thereof in a plane at right angles to said first mentioned plane, straight inclines formed on diametrically opposite sides of said yoke, anti-frictional means carried by each brake shoe at its intermediate portion adapted to be engaged by said inclines for forcing the brake shoes into engagement with the rotatable part, a pivoted line for suspending one end of each brake shoe, means for loosely pivoting the opposite end of each brake shoe, means attached to one end of said yoke for causing a transverse movement of the yoke and an engagement of the inclines with said anti-frictional means, a spring associated with the opposite end of said yoke for returning the same to inoperative position, and springs carried by the ends of the brake shoes for returning said shoes to retracted position, upon the release of said operating position.

9. In a brake, the combination with a movable part and a part adapted to rotate, of a pair of oppositely disposed brake shoes, a pivoted link for suspending one end of each shoe from the stationary part, means for loosely pivoting the opposite end of each brake shoe to said stationary part, means for engaging the intermediate portion of each brake shoe for forcing said brake shoes outwardly to engage the rotatable part and resilient means carried by the ends of said brake shoes for normally maintaining the brake shoes in retracted position.

LUCIAN C. ALGEE.
WALKER E. DICKSON.